(12) United States Patent
Leem

(10) Patent No.: US 7,868,920 B2
(45) Date of Patent: Jan. 11, 2011

(54) MOBILE COMMUNICATION TERMINAL HAVING FUNCTION OF PHOTOGRAPHING MOVING PICTURE, AND METHOD FOR OPERATING SAME

(75) Inventor: Nack Hyun Leem, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 416 days.

(21) Appl. No.: 11/534,602

(22) Filed: Sep. 22, 2006

(65) Prior Publication Data

US 2007/0120963 A1    May 31, 2007

(30) Foreign Application Priority Data

Sep. 22, 2005    (KR) ...................... 10-2005-0088303

(51) Int. Cl.
*H04N 5/225* (2006.01)
*H04N 5/235* (2006.01)
*H04N 5/14* (2006.01)
*H04N 5/92* (2006.01)

(52) U.S. Cl. ................. 348/220.1; 348/221.1; 348/700; 386/326

(58) Field of Classification Search ................. 348/700, 348/14.02, 220.1, 239, 207.99, 221.1; 386/46, 386/125, 326
See application file for complete search history.

(56) References Cited

U.S. PATENT DOCUMENTS

| | | | |
|---|---|---|---|
| 5,838,678 A | 11/1998 | Davis et al. | |
| 6,462,778 B1 * | 10/2002 | Abram et al. | 348/239 |
| 6,862,038 B1 * | 3/2005 | Anderson | 348/207.99 |
| 6,934,461 B1 | 8/2005 | Strub et al. | |
| 2001/0003468 A1 * | 6/2001 | Hampapur et al. | 348/700 |
| 2002/0047936 A1 | 4/2002 | Tojo | |
| 2003/0113099 A1 * | 6/2003 | Kaku | 386/69 |
| 2003/0146981 A1 * | 8/2003 | Bean et al. | 348/222.1 |
| 2003/0197790 A1 * | 10/2003 | Bae | 348/211.99 |
| 2003/0227545 A1 * | 12/2003 | Soya et al. | 348/143 |
| 2005/0024500 A1 | 2/2005 | Katayama | |
| 2005/0069286 A1 * | 3/2005 | Miyashita et al. | 386/46 |
| 2007/0031126 A1 * | 2/2007 | Jung et al. | 386/124 |
| 2007/0139543 A1 * | 6/2007 | Goffin | 348/296 |
| 2008/0075174 A1 * | 3/2008 | Jiang et al. | 375/240.26 |

* cited by examiner

*Primary Examiner*—Lin Ye
*Assistant Examiner*—Mekonnen Dagnew
(74) *Attorney, Agent, or Firm*—Workman Nydegger

(57) ABSTRACT

Provided are a mobile communication terminal having a function of photographing a moving picture, and a method for operating the same. The terminal includes a camera, an input unit, a video processor, and a controller. The input unit inputs a section setting command while photographing the moving picture. The video processor calculates a brightness value per frame from a video signal received from the camera, and generates moving picture data. The controller sets at least one section to the moving picture data depending on at least one of the section setting command and a variation of the brightness value, and plays the moving picture data on a per-set section basis.

20 Claims, 10 Drawing Sheets

MOBILE COMMUNICATION TERMINAL HAVING FUNCTION OF PHOTOGRAPHING MOVING PICTURE, AND METHOD FOR OPERATING SAME This Nonprovisional application claims priority under 35 U.S.C. §119(a) on Patent Application No. 10-2005-0088303 filed in Korea on Sep. 22, 2005, the entire contents of which are hereby incorporated by reference.

BACKGROUND OF THE INVENTION

1. Field of the Invention

The present invention relates to a mobile communication terminal being configured to photograph a moving picture, and a method for operating the same. More particularly, the invention relates to a mobile communication terminal configured to photograph a moving picture and a method for operating the same by automatically or manually setting a section to a moving picture while photographing the moving picture, and playing the moving picture on a per-section basis.

2. Description of the Background Art

In recent years, a mobile communication terminal has been provided with a camera so that the mobile communication terminal can conveniently photograph an image or a moving picture. Specifically, this type of mobile communication terminal has been provided with a large capacity memory or a separate extension memory so that it can not only photograph a plurality of the images but also photograph the moving picture for an extended period.

The mobile communication terminal can store the photographed image or moving picture in the memory, and can view the image or the moving picture using an album or can play the moving picture by using a play function. The stored moving picture is played by pressing a play button that causes the mobile communication terminal to display a video based on a time on a screen.

Playing the stored moving picture, the mobile communication terminal displays the video based on the time on the screen. The mobile communication terminal can fast play the moving picture at a constant speed. The mobile communication terminal can also change a play position for the moving picture back and forth by set time intervals However, the mobile communication terminal has a drawback in that the play position merely shifts on basically a set-time basis, and it may be difficult for the play position to change by an arbitrary time. In other words, the mobile communication terminal can shift the play position back and forth on the set time basis, for example, on a ten-second basis while playing the moving picture, but has a drawback that the play position cannot directly shift to a specific position of the in-play moving picture.

The play position cannot directly change into the specific position of the moving picture. Thus, there is a drawback in that a content of the moving picture that a user intends to check cannot be instantly checked, and a desired content is not found until a back/forth shift based on a set value is performed.

Specifically, the mobile communication terminal has a drawback that, if the in-play moving picture is large, it may take a long time to find a specific content in the moving picture. It may also be difficult to distinguish and split or edit the in-play moving picture by the content.

SUMMARY OF THE INVENTION

Accordingly, the present invention is directed to devices and methods to solve at least the problems and disadvantages of the background art.

Embodiments of the present invention include a mobile communication terminal having a function of photographing a moving picture, and a method for operating the same. The terminal may be configured to set a section to the moving picture while photographing the moving picture, thereby making it possible to play the moving picture on a per-section basis. The terminal may also be configured to instantly play a specific portion of the moving picture using a section shift, to facilitate a section search, and to perform a scene capture depending on a content of the moving picture.

To achieve these and other advantages, and in accordance with the purpose of the present invention, as embodied and broadly described, there is provided a mobile communication terminal having a function of photographing a moving picture. The terminal includes a camera, an input unit, a video processor, and a controller. The input unit inputs a section setting command while photographing the moving picture. The video processor calculates a brightness value per frame from a video signal received from the camera, and generates moving picture data. The controller sets at least one section to the moving picture data depending on the section setting command and/or a variation of the brightness value. The controller also plays the moving picture data on a per-set section basis.

The controller may automatically set the section to the moving picture data when an amount of variation of the number of the frames per second is equal to or more than a reference frame rate, where a frame rate level set based on the number of the frames per second is varied, where an amount of variation of the brightness value between the frames is equal to or more than a reference brightness value, and/or where a brightness level set based on the brightness value is varied. The number of the frames per second may vary depending on the brightness value.

In another aspect of the present invention, there is provided a method for operating a mobile communication terminal having a function of photographing a moving picture. The method includes setting a section to the photographed moving picture; storing set section information together with moving picture data; and playing the moving picture data on a per-set section basis.

BRIEF DESCRIPTION OF THE DRAWINGS

The invention will be described in detail with reference to the following drawings in which like numerals refer to like elements.

DETAILED DESCRIPTION OF PREFERRED EMBODIMENTS

Preferred embodiments of the present invention will be described in a more detailed manner with reference to the drawings.

Embodiments of the present invention include setting a section to a moving picture depending on variations of input data and/or a video signal while photographing the moving picture. The method may also include providing functionality for a mobile communication terminal to play the moving picture on a per-section basis. In setting the section, shifting on the per-section basis, and playing on the per-section basis, the present invention is not limited to a mobile communication terminal, and is applicable to a device for photographing and playing the moving picture.

Figure 1:
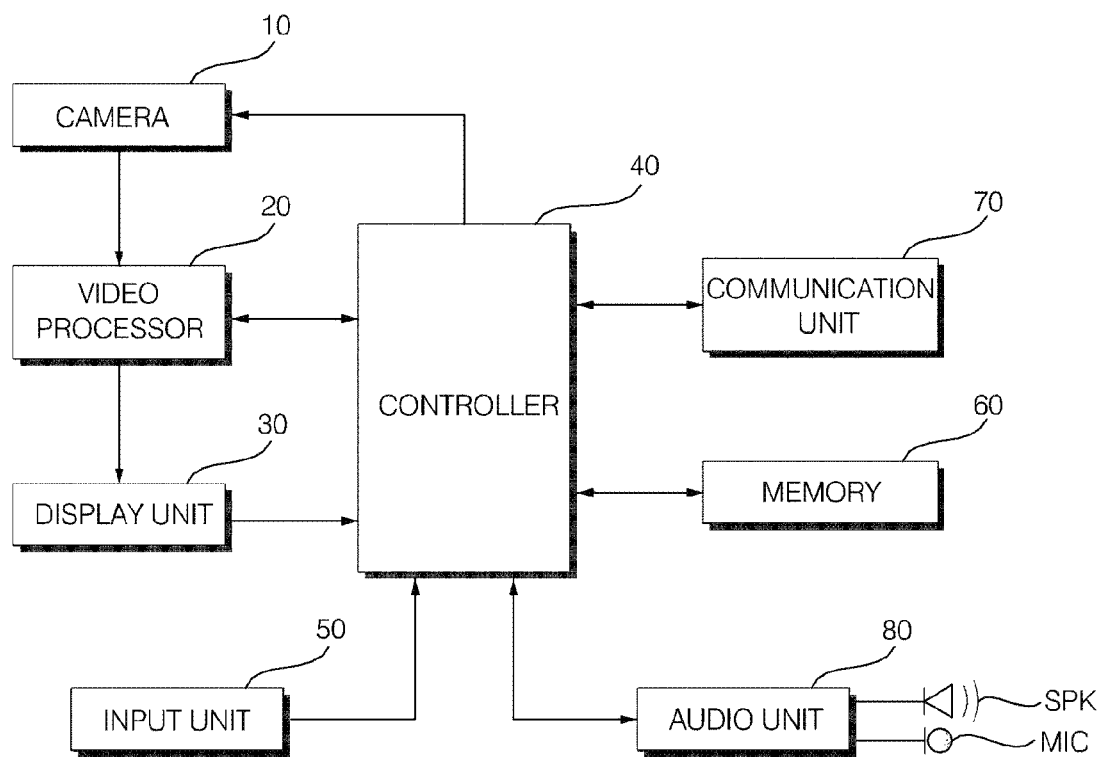
FIG. 1 is a block diagram illustrating a construction of a mobile communication terminal according to the present invention.

An exemplary embodiment of the present invention will be described with reference to the accompanying drawings below. FIG. 1 is a block diagram illustrating a construction of the mobile communication terminal according to the present invention.

As shown in FIG. 1, the mobile communication terminal according to the present invention includes a camera 10 for photographing an image or the moving picture, a video processor 20 for converting the video signal received from the camera 10, for generating image data or moving picture data, and for controlling an exposure of the camera 10; a display unit 30 for displaying the image data or the moving picture data; an input unit 50 having a plurality of buttons for inputting data; and a controller 40 for setting the section to the moving picture data, and playing the moving picture data on the per-section basis.

The mobile communication terminal further includes a memory 60 for storing the image data or the moving picture data taken by the camera 10, a communication unit 70 for communicating data with the exterior; an audio unit 80 for converting an audio signal included in the moving picture data, a speaker (SPK) for outputting the audio signal converted by the audio unit 80, and a microphone (MIC) for collecting and inputting a peripheral sound.

A description of known configurations of the mobile communication terminal of the present invention incorporated herein will be omitted for clearness.

The input unit 50 includes a plurality of buttons and applies a signal generated by button manipulation to the controller 40 to input data. The input unit 50 further includes a plurality of function keys for applying signals for controlling an operation of the camera 10, storing/editing the moving picture data, and playing the moving picture when the image or the moving picture is photographed using the camera 10. The input unit 50 further includes a direction key or shift key (not shown) for setting an operation and selecting a menu. Specifically, the input unit 50 includes a section setting key (not shown) for generating a section setting command to set the section to the photographed moving picture. In addition, the input unit 50 includes an input means, such as a jog button, a jog wheel, and/or a dial, for enabling predetermined selection and data input depending on manipulation.

The section setting key can be provided as any key among the plurality of keys, or can be provided separately. The section setting key applies a predetermined signal to the controller 40 and sets the section to the photographed moving picture.

When the image or the moving picture is photographed using the camera 10, the direction key or shift key applies a signal for setting a photographing condition, such as zoom-in/out or brightness of the camera 10. Additionally, when the photographed moving picture data is played, the direction key or shift key applies a section shift signal for shifting a play position between one or more sections set to the moving picture data, and shifts the play position to a previous section or a next section to play the moving picture from the previous section or next section.

The mobile communication terminal can include a side key (not shown) at any one side. Like the direction key or the shift key, the side key applies a signal based on the shifting of the play position between the sections.

The display unit 30 displays an operation state of the mobile communication terminal on the screen. The display unit 30 displays a menu for function setting, and a menu for the image or moving picture provided using the camera 10. The display unit 30 displays the image or the moving picture, photographed in the camera 10 and converted in the video processor 20, on the screen. The display unit 30 displays section information set to the moving picture data, or displays section information set by a separate menu, as a list.

The communication unit 70 provides voice call and message communication by data communication with one or more external network, and downloads contents from the external network, and transmits the image or moving picture data photographed by the camera 10 to the external network.

The audio unit 80 converts voice data during a call and outputs the converted data through the speaker (SPK). The audio unit 80 converts voice data received from the microphone (MIC), and transmits the converted voice data. When the moving picture is photographed, the audio unit 80 converts a sound received from the microphone (MIC), and stores the converted sound, together with the moving picture data photographed by the camera 10 in the memory 60. The audio unit 80 also analyzes and converts an audio signal included in the moving picture data and outputs a predetermined audio signal through the speaker (SPK).

Figure 2:
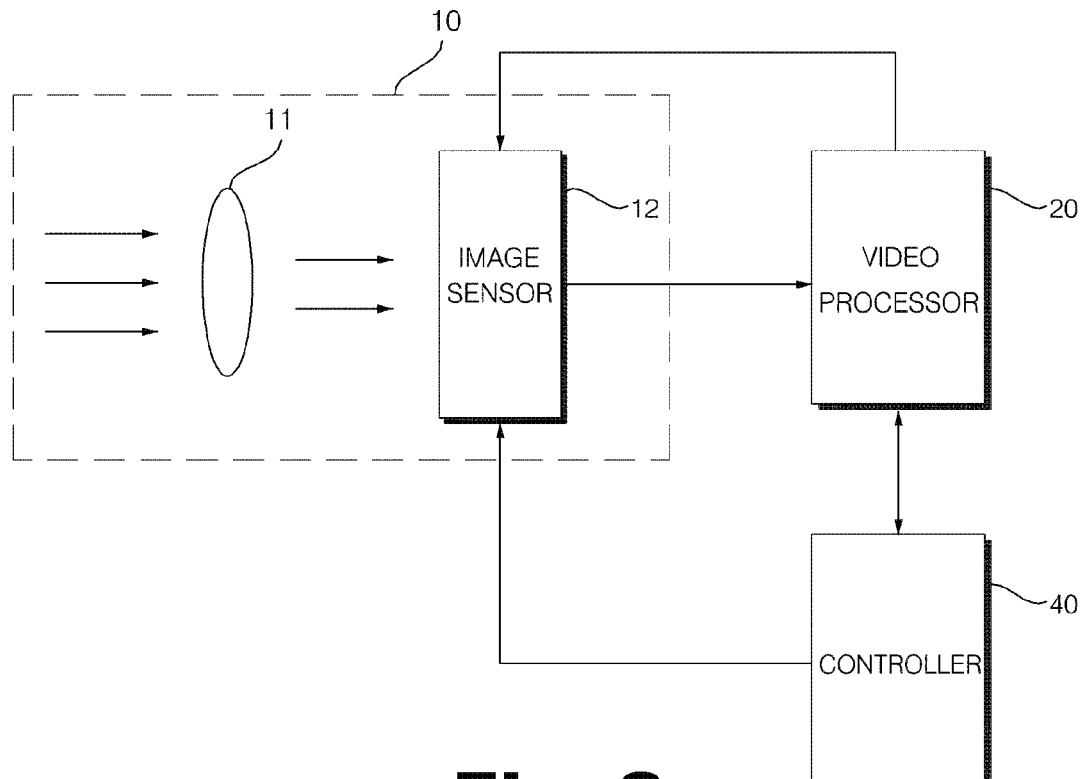
FIG. 2 illustrates a signal flow in a camera of a mobile communication terminal according to the present invention.

FIG. 2 illustrates a signal flow in the camera of the mobile communication terminal according to the present invention.

As shown in FIG. 2, the camera 10 includes a lens 11, and an image sensor 12 for converting a light incident on the lens 11 into an electric signal and outputting the video signal. The image sensor 12 can employ a charge coupled device (CCD) and a complimentary metal oxide semiconductor (CMOS), and is not limited to the image sensor 12 disclosed.

The video processor 20 generates the image or moving picture data from the video signal that is received from the image sensor 12. The video processor 20 calculates a brightness value between frames of the video signal received from the image sensor 12, and controls an exposure of the image sensor 12. The video processor 20 calculates an average brightness value between the frames, and variably controls the number of the frames per second of the image sensor 12 depending on the brightness value, thereby controlling an exposure time. The mobile communication terminal can further include a buffer (not shown) for temporarily storing the video signal from the image sensor 12.

Turning again to FIG. 1, the video processor 20 converts the analog video signal received from the camera 10 to a digital signal, generates the image data or moving picture data based on a predetermined format, and stores the generated image data or moving picture data in the memory 60. The video processor 20 analogously converts the image data or moving picture data stored in the memory 60, and outputs the converted image data or moving picture data to the display unit 30.

In other words, the video processor 20 encodes the video signal received from the camera 10 to a predetermined format, analyzes and decodes the image or moving picture data from a format, and outputs the decoded image or moving picture data to the display unit 30. The image processor 20 converts a setting or size of the outputted image or moving picture depending on the display unit 30, and outputs the converted setting or size to the display unit 30.

The controller 40 displays the moving picture data generated by the video processor 20, using the display unit 30. The controller 40 controls the operation of the camera 10, such as photographing, stopping, and storing the image or moving picture, in response to key pressing using the input unit 50.

When the video processor 20 converts the video signal received from the activated camera 10, and generates the moving picture data, the controller 40 stores the generated moving picture data in the memory 60. The controller 40 reads information on the play position of the moving picture data photographed by the camera 10, sets the section, and, upon completion of the photographing, stores the set section together with the moving picture data.

The controller 40 activates and controls the display unit 30 to display the video signal received from the camera 10 and converted in the video processor 20. The controller 40 also reads the selected moving picture data from the memory 60, converts the read moving picture data using the video processor 20 or the audio unit 80, and outputs the converted video data, together with the audio signal, using the display unit 30 or the speaker (SPK).

Playing the stored moving picture data, the controller 40 analyzes section setting data included in the moving picture data, and plays the moving picture data on the per-section basis. If the stored moving picture data is converted and outputted to the display unit 30 by the video processor 20 when input is performed using the input unit 50, the controller 40 changes the play position from a current play position to the previous section or the next section depending on the set section information, and plays the moving picture starting from the set section. If input is sequentially performed using the input unit 50, the controller 40 sequentially shifts the play position in the set section.

Figure 3:
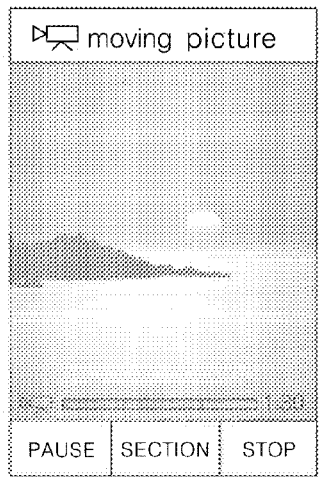
FIG. 3 illustrates photographing a moving picture in a mobile communication terminal according to an exemplary embodiment of the present invention.

FIG. 3 illustrates photographing the moving picture in the mobile communication terminal according to an exemplary embodiment of the present invention. Simultaneous reference will be made to the components of FIG. 1 to describe photographing the moving picture.

As shown in FIG. 3, when the camera 10 is activated in response to the key press, the mobile communication terminal converts the video signal that is received from the camera 10 by the video processor 20, and displays a preview on the display unit 30 and at the same time temporarily stores the preview in the memory 60.

While photographing the moving picture, the controller 40 sets the section depending on pressing of the section setting key and the variation of the video signal, and stores information on at least one of a play position and a play time, together with the moving picture data, as the section setting data in the memory 60.

Figure 4:
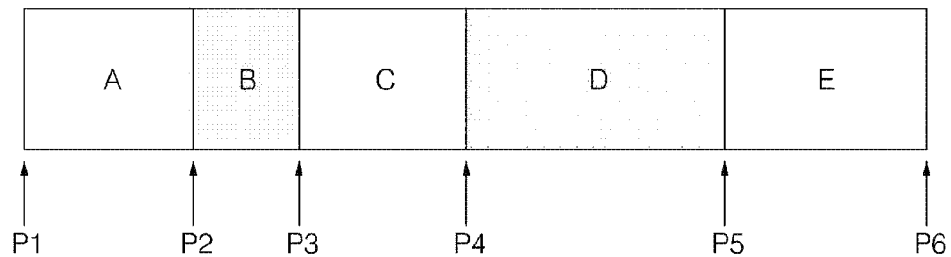
FIG. 4 illustrates setting a section to a moving picture in a mobile communication terminal according to an exemplary embodiment of the present invention.

FIG. 4 illustrates setting the section to the moving picture in the mobile communication terminal according to an exemplary embodiment of the present invention.

As shown in FIG. 4, when the section setting key is pressed in the course of photographing the moving picture data including one or more contents, the controller 40 detects the pressing of the section setting key and sets the section to the photographed moving picture data. If the moving picture is photographed using the camera 10, when the section setting key is pressed the controller 40 reads the information on the play position of the photographed moving picture data, sets the section, and, upon the completion of the photographing, stores the set section together with the moving picture data.

In other words, upon the receipt of a predetermined operation signal from the input unit 50, the controller 40 activates the camera and initiates the photographing of the moving picture (P1). When the section setting key is pressed in photographing (P2 to P5), the controller 40 sets the section to a corresponding position. Upon the completion of the photographing, the controller 40 stores information on the set section, and stores the moving picture data.

For example, in a case where one moving picture data includes a video having one or more different contents, the section setting key can be arbitrarily pressed, on a per-content basis, by the user. As the section setting key is pressed, the section is set to the moving picture. In other words, if one moving picture data includes the video having the different contents (A to E), when the section setting key is pressed (P2 to P5), the sections can be distinguishably set to the moving picture. The controller 40 sets the section depending on the variation of the video signal. In particular, the controller 40 sets the section to the moving picture data generated by the video processor 20, depending on a variation of the brightness value between the frames of the video signal received from the video processor 20. Upon the completion of the photographing, the controller 40 stores the moving picture data including the section information in the memory 60. The controller 40 sets a brightness level depending on the brightness value calculated by the video processor 20, and automatically sets the section to the moving picture data when the set brightness level varies. In other words, when the sequentially inputted brightness value, which is calculated on a per-frame basis, is within a predetermined range, the controller 40 can set the brightness level corresponding to the range. When the brightness level of the frame is different from a brightness level of a previous frame, the controller 40 can set the section to the moving picture data.

Even though the brightness level set based on the brightness value varies, the controller 40 does not set the section when an amount of the variation of the brightness value between the frames is equal to or less than a reference brightness value, and may set the section when the amount of the variation of the brightness value is more than the reference brightness value.

When the number of frames per second of the image sensor 12 is varied using the video processor 20, the controller 40 determines that the brightness value between the frames is varied, and automatically sets the section to the moving picture data.

Depending on the brightness value calculated by the video processor 20, an exposure time of the image sensor 12 is variably controlled. The exposure time is controllable by varying the number of frames per second of the image sensor 12. Thus, when the number of the frames per second varies, the controller 40 determines that the exposure time, and consequently the brightness value is varied, and sets the section.

The controller 40 calculates the number of the frames per second, that is, an amount of a variation of a frame rate of the image sensor 12 controlled by the video processor 20, and automatically sets the section to the moving picture data when the frame rate is equal to or more than a reference frame rate. The controller 40 distinguishes the frame rate by one or more ranges on a maximal available frame rate basis. When a current frame rate is within a predetermined range, the controller 40 sets a frame rate level based on the range. When the frame rate level varies, the controller 40 can set the section to the moving picture data.

The controller 40 may also set the section to the moving picture data depending on the pressing of the section setting key and/or the variations of the calculated brightness value between the frames and the frame rate varying depending on the brightness value, thereby setting one or more sections to one moving picture. Playing the moving picture data stored in the memory 60, the controller 40 can play the moving picture data on the per-section basis using the section information.

In other words, when the mobile communication terminal photographing the moving picture moves in position from a bright place (A) to a dark place (B), for example, when the mobile communication terminal enters an underground parking lot from the exterior, a peripheral brightness suddenly varies. Thus, the controller 40 automatically sets the section to a second point (P2) of the moving picture data depending on the variations of the brightness value/frame rate. When the mobile communication terminal is out of the underground parking lot, the brightness value between the frames and the frame rate of the image sensor vary as the peripheral brightness varies. Thus, the controller 40 sets the section to a third point (P3) depending on the variations of the brightness value and the frame rate.

The controller 40 sets the sections to predetermined points (P4 and P5) of the moving picture data, depending on the variations of the peripheral brightness and the frame rate based on the peripheral brightness, up to a time point (P6) where the photographing of the moving picture ends.

If the section setting key is pressed and/or the variations of the calculated brightness are detected, the controller 40 reads the information on at least one of the play position and the play time of the moving picture data, and sets the section. The controller 40 stores the set section as the section setting data and upon the completion of the photographing of the moving picture data stores the moving picture data including the section setting data in the memory 60.

In the set section, multiple pieces of section information can be included in one section setting data, and can be stored in a specific portion, for example, a header of the moving picture data. The section information can be stored, including the section setting data, in each position where the section is set. The section setting data includes the play position or the play time of the moving picture in a time point where the section is set. Specifically, the section setting data can be stored in a synchronous sample number (STSS) of the moving picture data.

Figure 5:
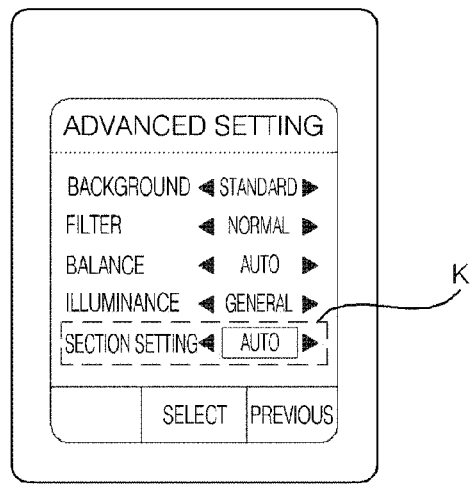
FIG. 5 is an example of a section setting menu in a mobile communication terminal according to an exemplary embodiment of the present invention.

FIG. 5 is an example of a section setting menu in the mobile communication terminal according to an exemplary embodiment of the present invention. A menu of the mobile communication terminal, which is an exemplary embodiment of a plurality of menu configurations, can be varied and is not limited to FIG. 5.

As shown in FIG. 5, "manual" or "automatic" section setting (K) can be selected such that the section is automatically set to the moving picture in the course of photographing the moving picture. As described above, the controller 40 sets the section corresponding to any one of the pressing of the section setting key and the variation of the video signal depending on the menu setting. When the "automatic" section setting (K) is selected, the section is automatically set depending on the variation of the brightness value in the course of photographing of the moving picture.

Figure 6C:
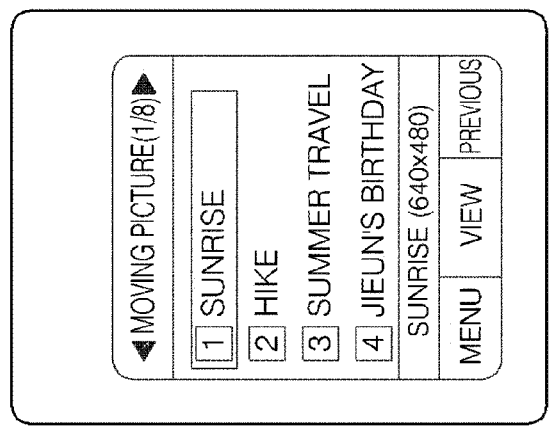
FIGS. 6A-6C illustrate an example of a moving picture album in a mobile communication terminal according to an exemplary embodiment of the present invention.
Figure 6B:
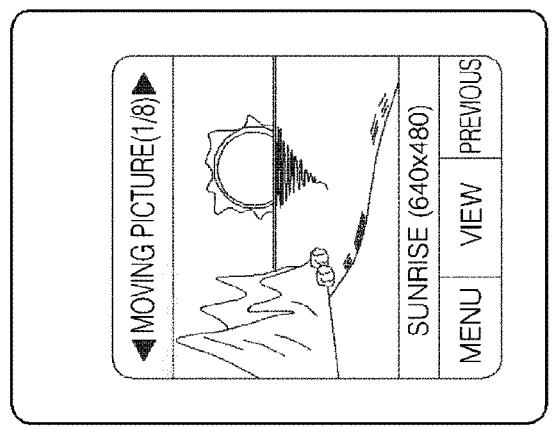
Figure 6A:
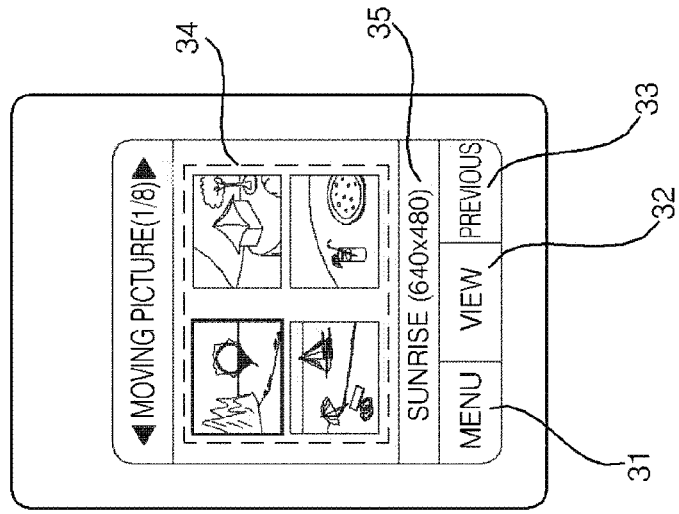

FIGS. 6A-6C illustrate an example of a moving picture album in the mobile communication terminal according to an exemplary embodiment of the present invention. As shown in FIGS. 6A-6C, a list of the stored moving picture data is displayed on the screen using the display unit 30. As shown in FIG. 6A, the moving picture data can be output as an image list 34 with multiple picture data. Some images of the moving picture may also be displayed so that the user can recognize the content of the moving picture. If specific moving picture data is selected from the image list 34, information on the selected moving picture data is displayed in an information window 35 provided under the image list 34. The information window 35 can display information on a title, a resolution, a photographing date, and a size of the selected moving picture data.

A menu button 31, a view button 32, and a shift menu 33 are displayed under the screen of the display unit 30. The menu button 31 may be used to perform minute setting for the selected moving picture data. The view button 32 may be used to play the currently selected moving picture data. The shift menu 33 makes it possible to perform a page shift of a main menu or the image list 34. When left/right shift/direction keys are pressed, previous/next image lists are displayed.

As shown in FIG. 6B, one moving picture data can be displayed in its storage sequence. Here, one moving picture is displayed on one screen, and previous/next moving picture data is displayed in response to the pressing of the left/right shift/direction keys.

As shown in FIG. 6C, the list of the moving picture data can be arranged and displayed by title. It is possible to arrange the list by the title, the photographing date, and the size of the moving picture data depending on selection.

When predetermined moving picture data is selected from the list of the moving picture data as shown in FIGS. 6A and 6C, one moving picture data is displayed on the screen as shown in FIG. 6B.

Figure 7C:
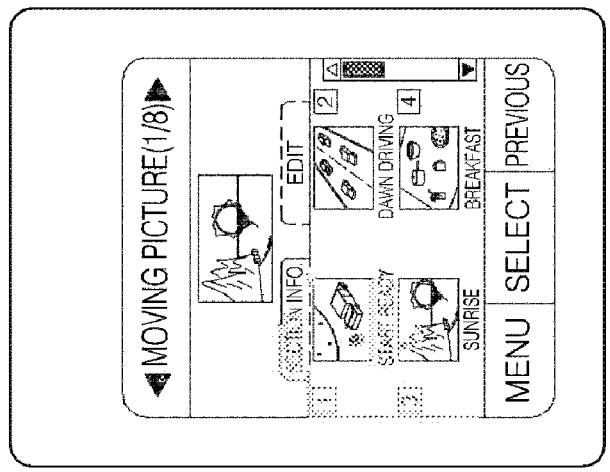
FIGS. 7A-7C illustrate an example of a section information menu in a mobile communication terminal according to an exemplary embodiment of the present invention.
Figure 7B:
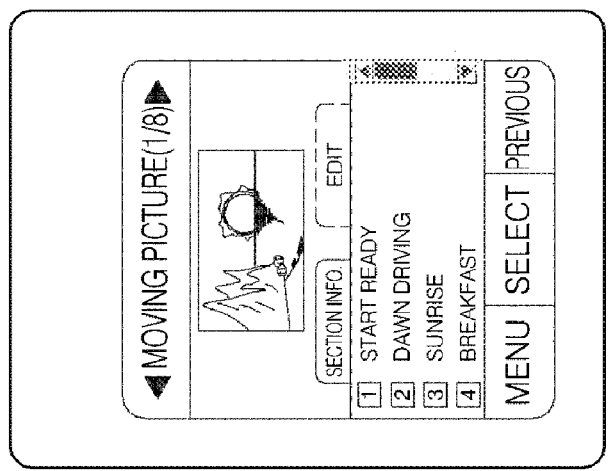
Figure 7A:
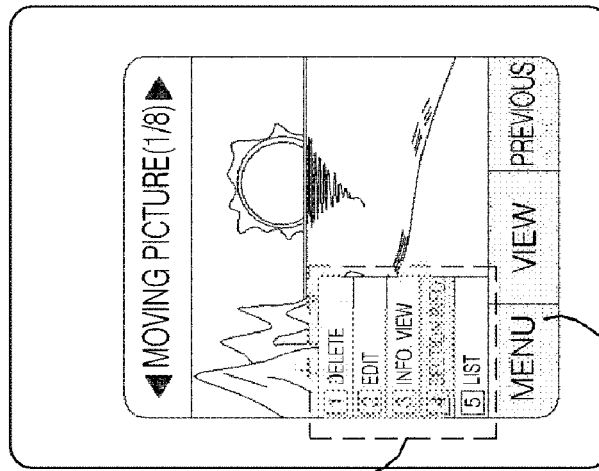

FIGS. 7A-7C illustrate an example of a section information menu in the mobile communication terminal according to an exemplary embodiment of the present invention.

As shown in FIG. 7A, if one moving picture data is selected, minute setting and selection can be performed for the selected moving picture data. When the menu button 31 is pressed, a sub menu 36 of the currently selected moving picture is displayed. It is possible to select the sub menu such as "delete", "edit", "information view", "section information", and "list" of the selected moving picture data.

As shown in FIG. 7B, when the "section information" option is selected, the section information set to the moving picture data is displayed. The controller 40 analyzes the section setting data, and displays the section information associated with the list using the display unit 30. When a specific section is selected from the section information list of the section setting data, the controller 40 plays the moving picture data of the selected section.

The section information can be displayed using one or more of a group that includes a list of names of the respective set sections, the play position in the moving picture, a time where the section is set, and a thumbnail image for the moving picture of each section. For example, the name of the set section is displayed by the list as shown in FIG. 7B, or the thumbnail image for the moving picture of the section can be displayed as shown in FIG. 7C.

When the "edit" is selected, it is possible to edit the section information. It is possible to edit the name of each section, and to merge at least one section or split one section into a plurality of sections.

FIG. 8 is an example of edition of the section information of the moving picture in the mobile communication terminal according to an exemplary embodiment of the present invention.

The mobile communication terminal provides a menu for setting the section and editing the set section while photographing the moving picture.

As shown on a display illustrated in FIG. 8 and with reference to the functionality of the components shown in FIG. 1, the mobile communication terminal can change the section setting data that is set to the moving picture data. In other words, upon the receipt of a user command from the input unit 50, the controller 40 can merge at least one of the plurality of sections that is set to the moving picture data, or split one section into the plurality of sections to change section setting information by menu setting. The controller 40 generates and stores the list for one or more set sections.

Figure 8A:
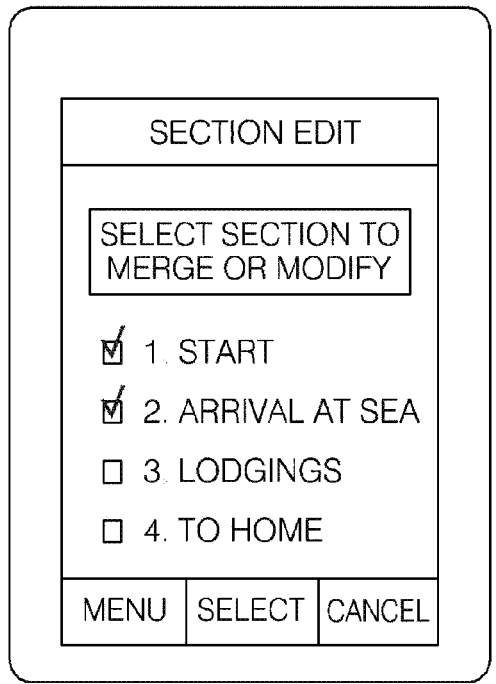
FIGS. 8A-8D illustrate an example of edition of section information of a moving picture in a mobile communication terminal according to an exemplary embodiment of the present invention.
Figure 8B:
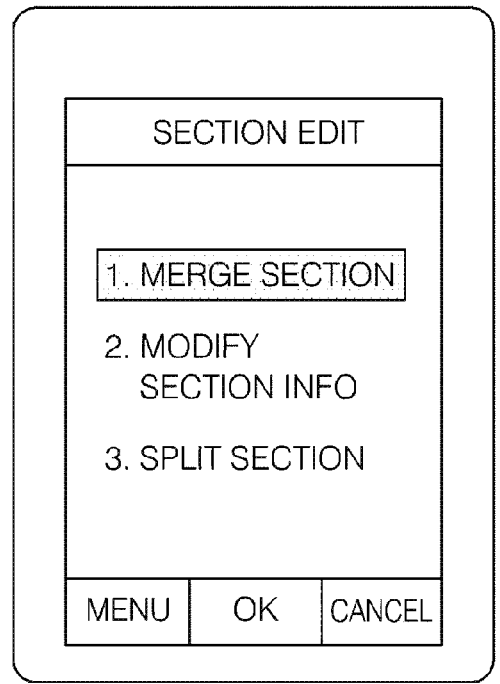
Figure 8C:
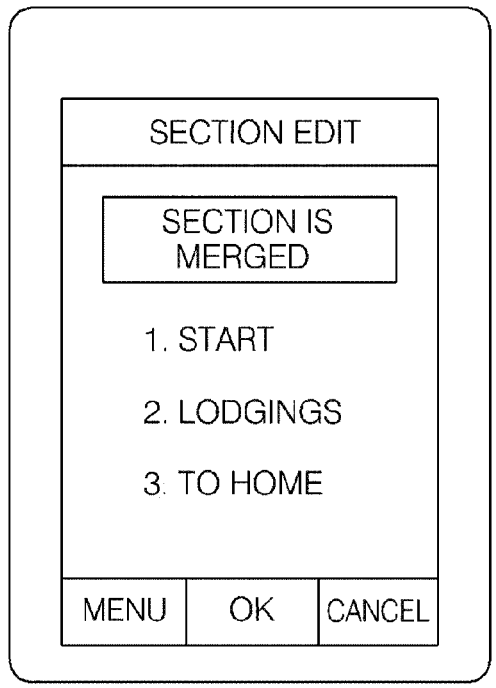

In other words, as shown in FIG. 8A, when a menu for editing the section setting data is called, the section information set to the moving picture data is displayed on the screen of the display unit 30. When a menu to be edited is selected as shown in FIG. 8B, the section set to the moving picture data is merged as shown in FIG. 8C, and new section information is displayed on the screen. In the section setting data set to the moving picture data, when the section is edited as above, the section information on the edited section automatically changes.

The mobile communication terminal can split the selected section into one or more sections. The selected section can be equally split into a predetermined number of sections, or can be split by any time depending on setting.

Figure 8D:
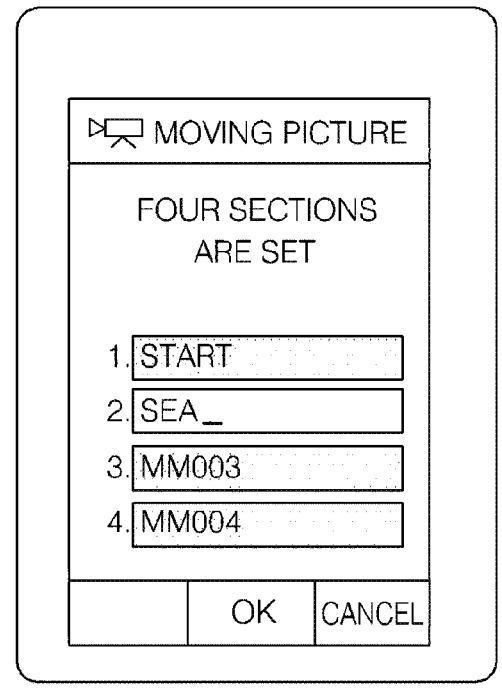

As shown in FIG. 8D, the mobile communication terminal can change the section information on one or more sections set to the photographed moving picture data. In other words, in a case where the moving picture is photographed and one or more sections are set, each section can be automatically given any name. The names automatically given to each name may then be edited as desired. Thus, it is possible to modify the name of each section.

Figure 9:
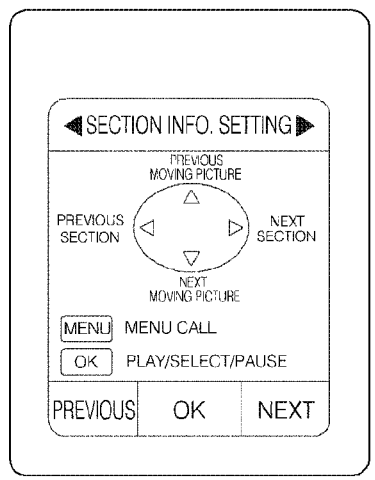
FIG. 9 is an example of a section shift menu in a mobile communication terminal according to an exemplary embodiment of the present invention.

FIG. 9 is an example of a section shift menu in the mobile communication terminal according to an exemplary embodiment of the present invention.

As shown in FIG. 9, when a predetermined menu is selected using the input unit 50, the mobile communication terminal can set guidance and change for the plurality of buttons of the input unit 50 used for playing the moving picture data. In other words, the buttons can be defined so that when the buttons for up/down/left/right direction keys are pressed a shift to the previous section/next section can be performed or a shift to a previous moving picture/next moving picture can be performed. Each button can be changed to provide a shift to initial section/final section or a fast forward/rewind.

A menu button can be provided for enabling a menu call when it is intended to provide a specific function or effect in the course of playing the moving picture. A button can be provided for performing "photograph", "select", "pause", "stop" of the moving picture.

When each button of the input unit 50 is manipulated in the course of playing the moving picture, the controller 40 shifts the section of the moving picture data, depending on the setting of the manipulated button, or plays other moving pictures.

An operation of the above constructed mobile communication terminal will be described below.

Figure 10:
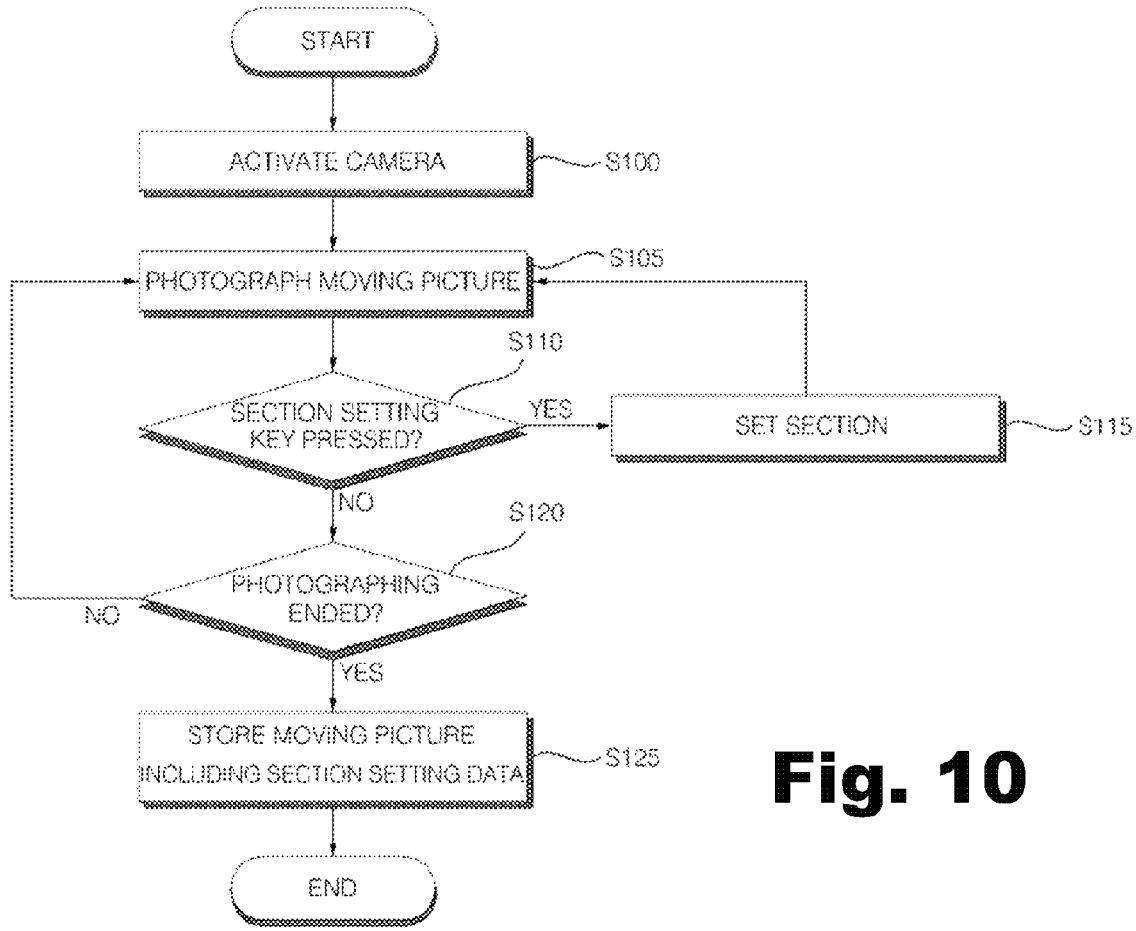
FIG. 10 is a flowchart illustrating a method for setting a section in a mobile communication terminal according to a first exemplary embodiment of the present invention.

FIG. 10 is a flowchart illustrating a method for setting the section in the mobile communication terminal according to a first exemplary embodiment of the present invention.

As shown in FIG. 10, if a predetermined command is inputted using the input unit 50, the camera 10 is activated (Step 100). In an image or moving picture photographing mode, the moving picture is photographed in response to pressing of "photographing key" (Step 105).

After the moving picture is photographed, a size, a picture quality, balance setting, and the number of frames of the photographed moving picture data are set. After the completion of the setting, when the "photographing key" is pressed, the video signal inputted using the camera 10 is displayed on the screen, and the moving picture is photographed. When the moving picture is photographed, the input video is displayed and at the same time, a photographing time or a pressable button is displayed. The video inputted using the camera 10 is also displayed on the screen of the display unit 30. Sound data inputted through the microphone is converted and is temporarily stored in the memory together with the photographed moving picture data.

When the "section setting key" is pressed in the course of photographing the moving picture, the pressing is detected and the section is set to the photographed moving picture data (Steps 110 and 115).

If the section is set, the section information on the play position or the play time of the moving picture data where the "section setting key" is pressed is stored as the section setting data. It is possible to set the plurality of sections while photographing the moving picture. The section setting data includes the section information on a position where the "section setting key" is pressed, and the section is set and stored. Alternately, each separate section setting data on each moving picture position where the "section setting key" is pressed can be stored.

When a "stop key" is pressed, the photographing of the moving picture stops, and the temporarily stored moving picture data is stored in the memory. The moving picture data is stored together, including the section setting data set in the course of photographing the moving picture (Steps 120 and 125).

When the moving picture data is stored or after the moving picture data is completely stored, the section setting data can change. In other words, one or more sections distinguished by the "section setting key" can be merged, or one or more sections can be split. The set section is generated as a list, and is stored together with the moving picture data.

Figure 11:
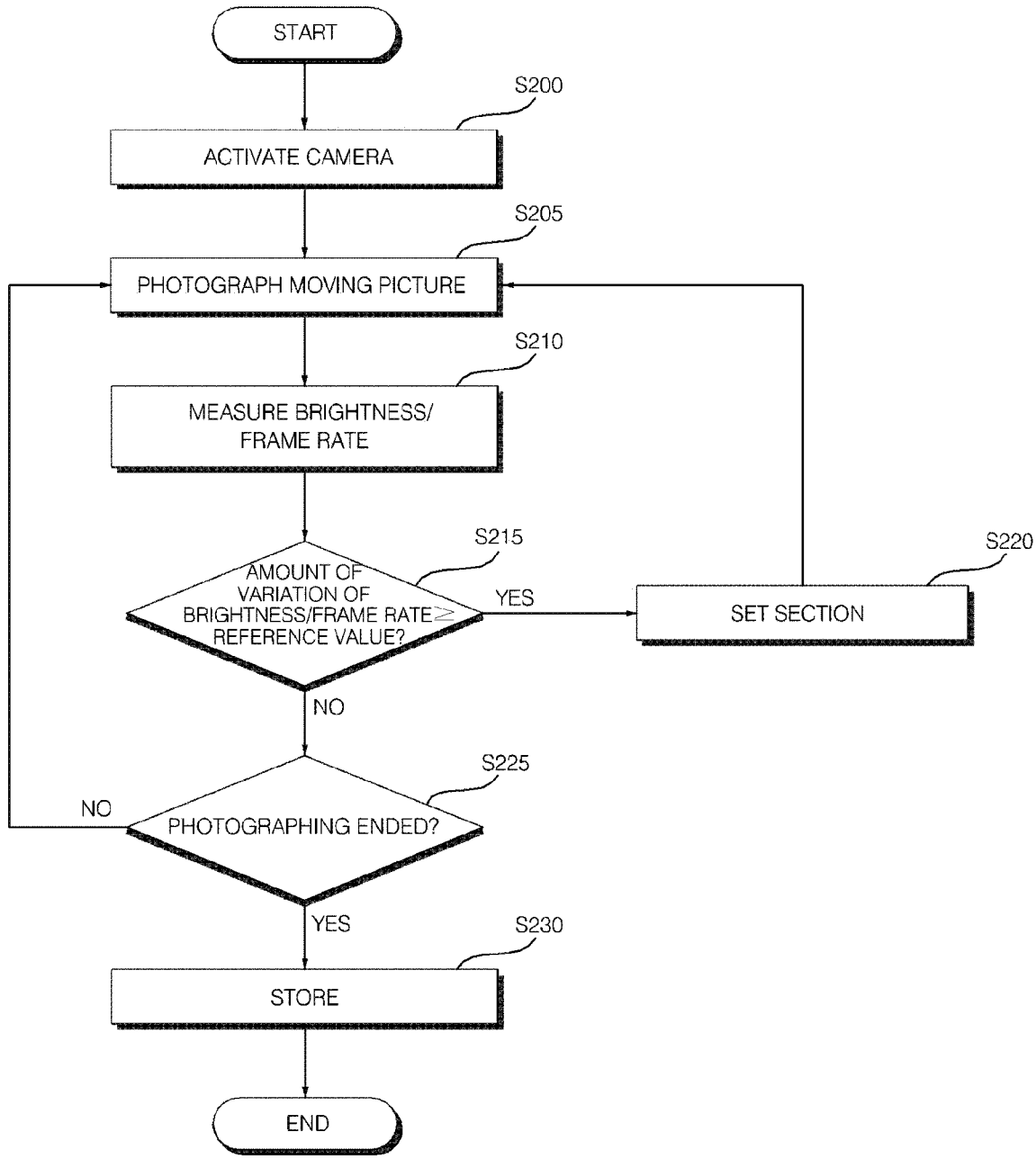
FIG. 11 is a flowchart illustrating a method for setting a section in a mobile communication terminal according to a second exemplary embodiment of the present invention.

FIG. 11 is a flowchart illustrating a method for setting a section in a mobile communication terminal according to a second exemplary embodiment of the present invention. FIG. 11 shows the method for setting the section depending on an amount of variation of a brightness value or a frame rate, in the course of photographing a moving picture. Reference will again be made to the components of FIG. 1 in describing the method.

A camera 10 is activated (Step 200), and the moving picture is photographed depending on setting (Step 205). When the moving picture is photographed, a light incident on a lens of the camera 10 is converted into an electrical video signal using an image sensor, and the converted video signal is inputted, thereby generating moving picture data on a per-frame basis.

The brightness value between frames is calculated on the basis of the inputted video signal. An exposure time of the image sensor varies depending on the brightness value. The number of the frames per second, that is, the frame rate of the photographed moving picture varies, thereby controlling the exposure time (Step 210).

An amount of variation between the frames is calculated for either the brightness value or the frame rate, and is compared with a reference value (Step 215). The amount of the variation of the brightness value is compared with a reference brightness value, and the amount of the variation of the frame rate is compared with a reference frame rate.

When the comparison result is that the amount of the variation of the brightness value/frame rate is equal to or more than the reference value, the section is automatically set to a current position of the moving picture data (Step 220).

The section of the moving picture data is set on the basis of the current play position and play time, on a moving picture photographing start time basis, and is stored as section setting data. Information on the play position or the play time in a position where the section is set can be separately extracted, thereby setting the section setting data. Alternately, section information can be inserted into the position of the moving picture data. The section can be set by inserting section setting information into a header of the moving picture data.

When the section setting is completed or when the amount of the variation of the brightness value/frame rate is less than a reference value, it is determined whether or not a photographing stop command is inputted in the course of photographing the moving picture (Step 225). When it is determined that the photographing stop command is not inputted, the moving picture is kept photographing, and the moving picture photographing and the section setting are repeatedly performed (Steps 205 to 220).

When the photographing stop command is inputted in the course of photographing the moving picture (Step 225), the photographing is ended, and the set section information is stored together with the photographed moving picture data (Step 230).

Figure 12:
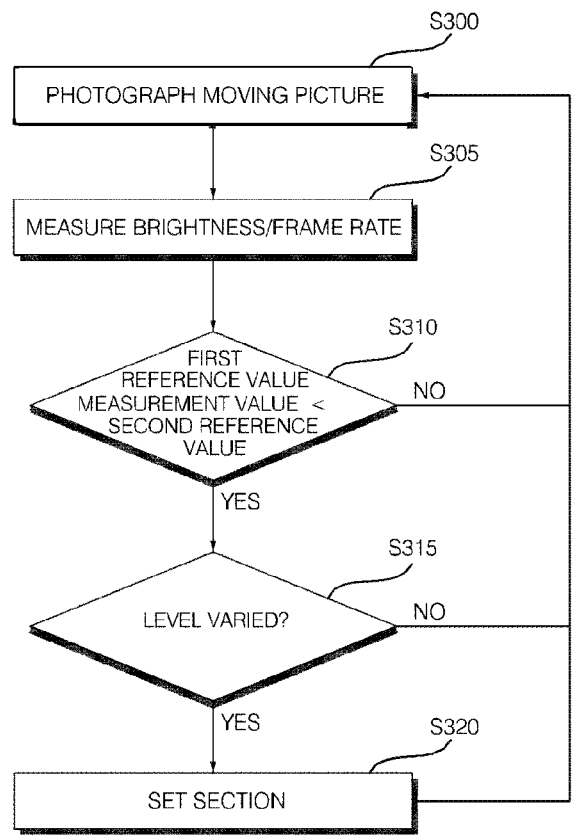
FIG. 12 is a flowchart illustrating a method for setting a section in a mobile communication terminal according to a third exemplary embodiment of the present invention.

FIG. 12 is a flowchart illustrating a method for setting a section in a mobile communication terminal (best seen in FIG. 1) according to a third exemplary embodiment of the present invention.

As shown in FIG. 12, when a camera 10 is activated and moving picture photographing starts, a video signal is inputted and moving picture data is generated (Step 300).

The brightness value or frame rate of the inputted video signal is measured (Step 305). It is determined whether or not the measured brightness value or frame rate is within a predetermined range (Step 310).

The brightness value is distinguished into one or more ranges, a brightness level is set for each range, and a range including the brightness value of the inputted frame is determined, thereby setting the brightness level.

The frame rate is distinguished into one or more ranges on a settable maximal frame rate basis of the camera 10, and a frame rate level is set for each range. When a current frame rate is within a predetermined range, its corresponding frame level is set.

For example, the section may be set to the moving picture data on the frame rate basis as shown in Tables 1 and 2 below. Tables 1 and 2 are examples based on level setting of the mobile communication terminal according to the present invention.

TABLE 1

| | Frame rate (30 fr) |
|---|---|
| 1 | 0 ≦ frame rate < 6 |
| 2 | 6 ≦ frame rate < 12 |
| 3 | 12 ≦ frame rate < 18 |
| 4 | 18 ≦ frame rate < 24 |
| 5 | 24 ≦ frame rate < 30 |

As shown in Table 1, in an example where the maximal frame rate of the moving picture photographed by the camera 10 of the mobile communication terminal is equal to "30", the frame rate is divided into five ranges on the basis of the maximal frame rate of "30", to designate the frame rate level. The number of the frame rate levels is not limited to the drawings but is variable depending on setting.

When the camera 10 is activated and the video signal is inputted from an image sensor, the brightness value is calculated, and the frame rate of the image sensor is variably controlled depending on the brightness value. In a case where a user enters an underground parking lot from the exterior, a peripheral brightness suddenly varies. In this case, when the frame rates is equal to "15" outside, and the frame rate is equal to "5" within the underground parking lot, the frame rate level varies to "3" outside and the frame rate level varies to "1" within the underground parking lot. The frame rate level varies from "3" to "1" and therefore, the section is set to the moving picture data.

TABLE 2

| | Frame rate |
|---|---|
| 1 | $0 \leq \text{frame rate} < \frac{MFR}{5}$ |
| 2 | $\frac{1}{5}MFR \leq \text{frame rate} < \frac{2}{5}MFR$ |
| 3 | $\frac{2}{5}MFR \leq \text{frame rate} < \frac{3}{5}MFR$ |
| 4 | $\frac{3}{5}MFR \leq \text{frame rate} < \frac{4}{5}MFR$ |
| 5 | $\frac{4}{5}MFR \leq \text{frame rate} < MFR$ |

MFR: maximal frame rate

As shown in Table 2, the frame rate level can be set on the basis of the maximal frame rate where the camera 10 can photograph. The number of the frame rate levels is not limited to the drawings but is variable depending on the setting.

In other words, the frame rate level can be set by 20% on the basis of the maximal frame rate (MFR). For example, when the maximal frame rate (MFR) is equal to "60", a frame rate of 0 to 11 (that is, 60/5) can be set to a first level, a frame rate of 12 to 23 can be set to a second level, a frame rate of 24 to 35 can be set to a third level, a frame rate of 36 to 47 be set to a fourth level, and a frame rate of 48 or more can be set to a fifth level.

As described above, the brightness value is designated to one or more brightness levels, and the brightness level is set based on the brightness value of the inputted frame. When the measured brightness value or frame rate is out of the predetermined range (Step 310), the Step 300 is performed. When it is determined that the brightness level varies (Step 315), the section can be set to the moving picture data (Step 320). Otherwise, the Step 300 is performed.

Figure 13:
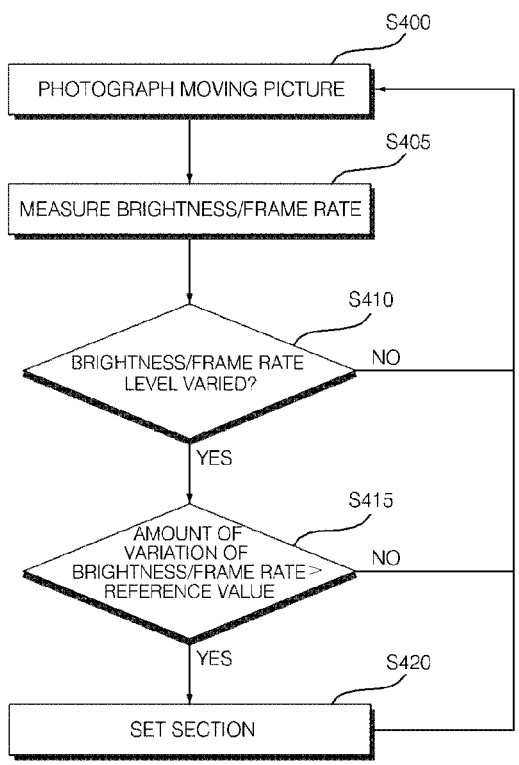
FIG. 13 is a flowchart illustrating a method for setting a section in a mobile communication terminal according to a fourth exemplary embodiment of the present invention.

FIG. 13 is a flowchart illustrating a method for setting a section in a mobile communication terminal according to a fourth exemplary embodiment of the present invention.

As shown in FIG. 13, when the camera 10 is activated and the moving picture is photographed, a brightness value of a frame is calculated depending on an inputted video signal, and a frame rate is variably controlled (Steps 400 to 410).

The brightness value or frame rate of the frame of moving picture data is measured, thereby setting a brightness level for the brightness value and a frame rate level for the frame rate. It is determined whether or not the brightness level or the frame rate level varies (Step 410).

If the brightness level is determined to vary, an amount of variation of the brightness value is calculated and compared with a reference brightness value (Step 415). If it is determined that the frame rate level varies, an amount of variation of the frame rate is calculated and compared with a reference frame rate (Step 415). Otherwise, the Step 400 is performed.

When the brightness value is greater than or equal to the reference brightness value, or when the amount of the variation of the frame rate is greater than or equal to the reference frame rate, a section is set to the moving picture data (Step 420).

When the brightness level or frame rate level is kept constant or when the amount of the variation of the brightness value/frame rate is less than the reference brightness value/reference frame rate, the moving picture is photographed without separately setting the section (Steps 410, 415, and 400).

For example, when the frame rate level is set and the reference frame rate is equal to "6" as in Table 1, the section is set depending on the variation of the frame rate as follows.

When the frame rate varies from "11" to "13", the frame rate level for the frame rate of "11" is equal to "2", and the frame rate level for the frame rate of "13" is equal to "3". Thus, it can be appreciated that the frame rate level varies.

Even though the frame rate level varies as above, the amount of the variation of the frame rate is calculated and compared with the reference frame rate. When the frame rate varies from "11" to "13", the variation amount is equal to "2". Thus, the variation amount of "2" is less than the reference frame rate of "6". Thus, the section is not set to the moving picture and the moving picture is kept photographing. If the section is set to the moving picture data and the moving picture data is stored, the moving picture data is played as follows.

Figure 14:
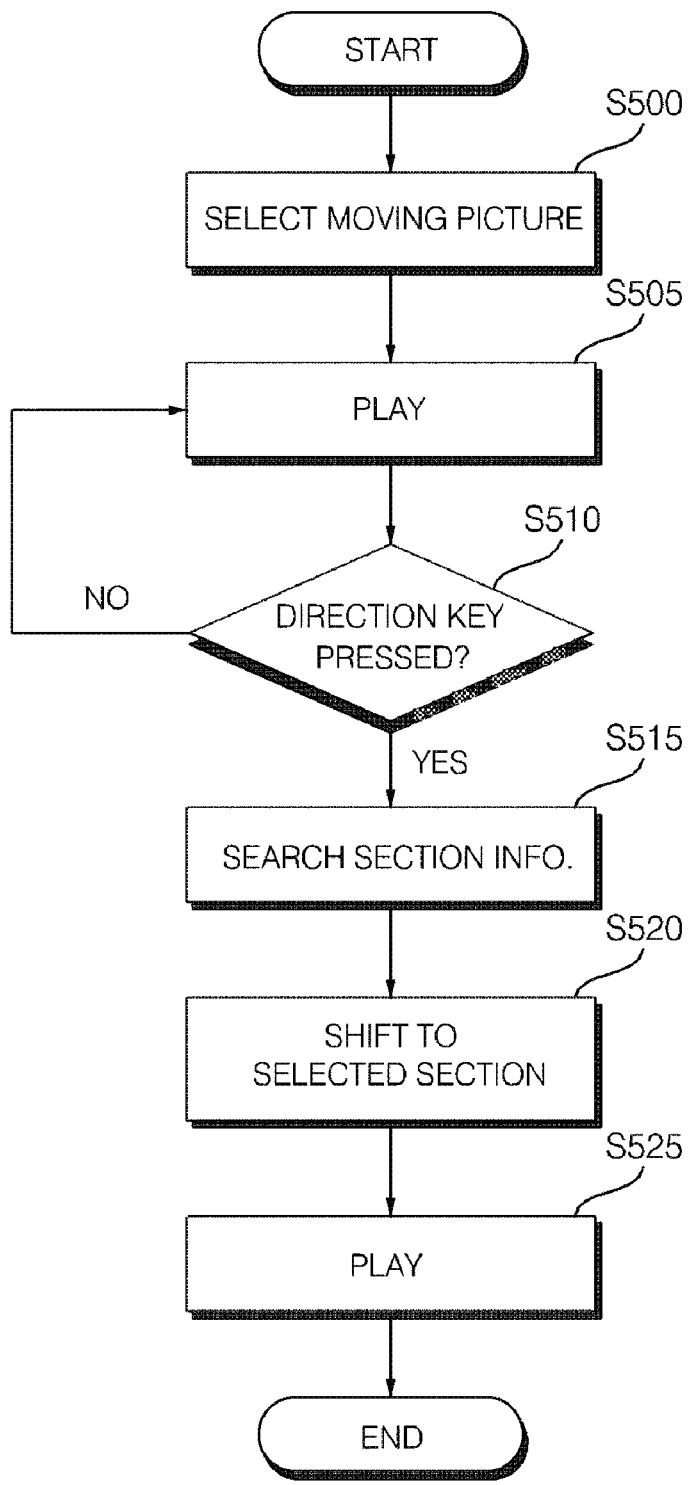
FIG. 14 is a flowchart illustrating a method for playing a moving picture in a mobile communication terminal according to the present invention.

FIG. 14 is a flowchart illustrating a method for playing the moving picture in the mobile communication terminal according to the present invention.

As shown in FIG. 14, when the moving picture data is selected, the stored moving picture data is called and played (Steps 500 and 505). It is possible to identify information on the selected moving picture data and specifically, it is possible to select and play a specific section using the section information set to the moving picture data.

When a section shift command is inputted in the course of playing the moving picture, for example, when the direction key, the side key, and the jog button are manipulated (Step 510), the section information set to the moving picture is searched (Step 515). On the basis of the searched section information, the play position is shifted from the current in-play position to the previous section or the next section in response to the inputted section shift command (Step 520). The play position shifts to an initial of the selected section.

When the play position changes as above, the moving picture is played starting from the selected section (Step 525).

The method for playing the moving picture in response to the input of the section shift command will be in detail described below.

Figure 15:
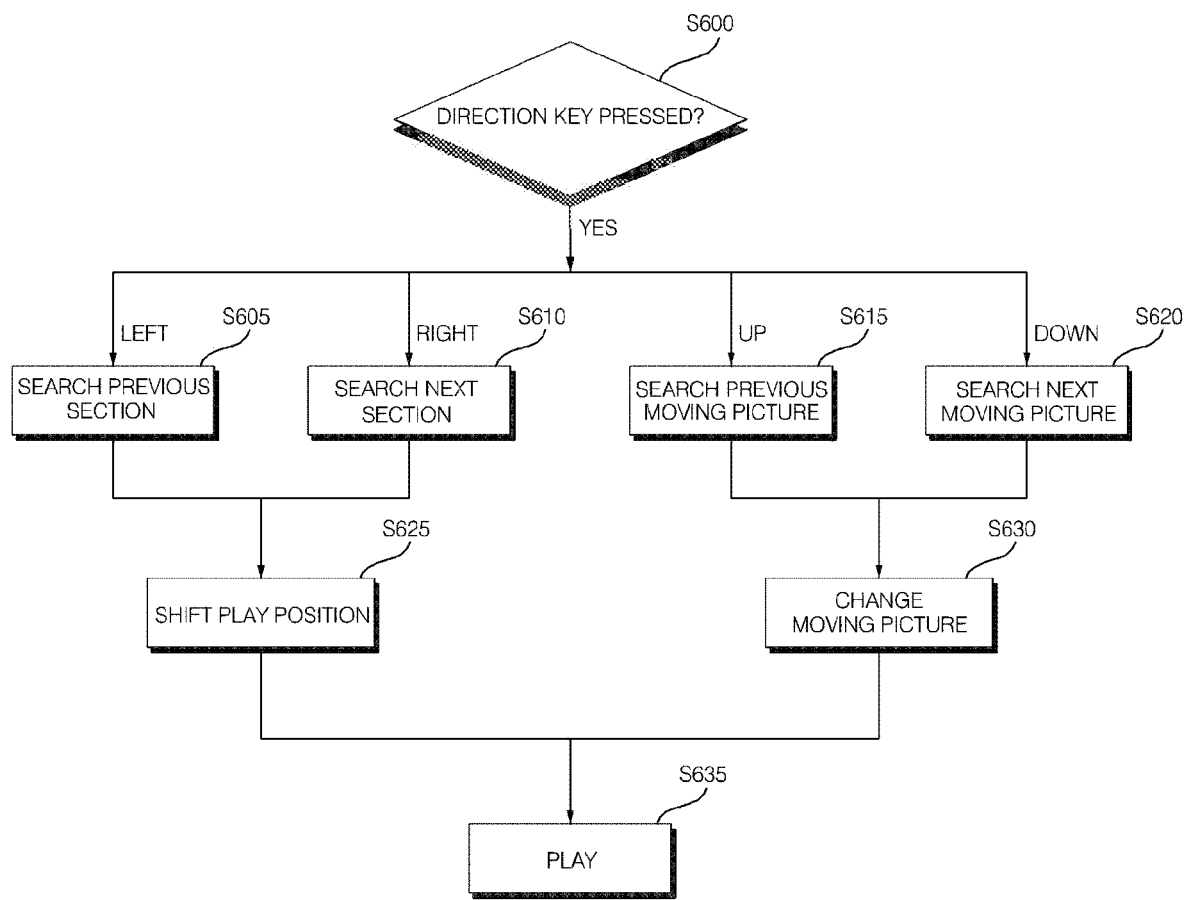
FIG. 15 is a flowchart illustrating a method for shifting a moving picture section in a mobile communication terminal according to the present invention.

FIG. 15 is a flowchart illustrating a method for shifting the moving picture section in the mobile communication terminal according to the present invention. As shown in FIG. 15, when the input means, such as the direction key, the shift key, the side key, the jog button, and the jog wheel, depending on a type of the input unit is manipulated, the section shift command is inputted (Step 600). A description will be made, exemplifying the direction key, below.

When the direction key is pressed, the section information set to the in-play moving picture data is searched. It is possible to search information on an entire section. It is possible to search a specific section depending on a kind of the pressed direction key. In other words, when a left direction key is pressed, the previous section is searched on the basis of the current play position of the moving picture data (Step 605), and the play position is shifted to an initial of the previous section (Step 625).

When a right direction key is pressed, the next section is searched on the basis of the current play position (Step 610), and the play position is shifted to an initial position of the next section (Step 625).

When the play position is shifted to the previous section or the next section, the moving picture data is played starting from the selected section (Step 635). When the left or right direction key is sequentially pressed, the section set to the moving picture data is sequentially searched, thereby changing the play position, and the moving picture is played starting from the searched section.

When up/down direction keys are pressed, previous moving picture data or next moving picture data is searched besides the in-play moving picture data (Steps 615 and 620), the played moving picture data is changed (Step 630), and the searched moving picture data is played (Step 635).

The above direction keys may be modified as desired to enable the fast forward/rewind, and can be set to shift to the initial section/final section. In other words, being manipulated as above, the up/down direction keys can be set such that they shift the play position to the initial section/final section, or change a play speed and perform the fast forward/rewind.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A mobile communication terminal configured to photograph a moving picture, the terminal comprising:
   a camera;
   an input unit for inputting a section setting command while photographing the moving picture with the camera;
   a video processor for generating moving picture data from a video signal received from the camera;
   a controller for setting at least one section to the moving picture data depending on the section setting command in the course of photographing the moving picture, wherein the controller automatically sets the section to the moving picture data in response to at least one of a group of cases that includes:
      a first case where a variation in a number of frames per second is greater than or equal to a reference frame rate, wherein the variation in the frames per second depends on a brightness value; and
      a second case where an amount of a variation of the brightness value between the frames is greater than or equal to a reference brightness value; and
   playing the moving picture data on a per-set section basis, wherein the at least one section is stored with the moving picture data.

2. The mobile communication terminal of claim 1, wherein the video processor variably controls the number of frames per second to control an exposure time of the camera, depending on the variation of the brightness value.

3. The mobile communication terminal of claim 1, wherein the controller sets the section on the basis of at least any one of play position and play time information of the moving picture data, and stores section setting data on the set section together with the moving picture data.

4. The mobile communication terminal of claim 3, wherein the controller stores the section setting data in a header of the moving picture data, and sets the section.

5. The mobile communication terminal of claim 4, wherein the controller stores section setting data in a STSS (synchronous sample number) of the moving picture data.

6. The mobile communication terminal of claim 3, wherein the controller searches the section setting data of the moving picture data, and plays the moving picture data on a per-selected section basis.

7. The mobile communication terminal of claim 6, wherein the controller changes the play position of the moving picture into a previous section or a next section while playing the moving picture data, in response to a signal received from the input unit.

8. The mobile communication terminal of claim 1, wherein the controller merges at least one of the at least one section that is set to the moving picture data, or splits one of the at least one section into a plurality of sections, changes section information and re-sets the section setting data.

9. The mobile communication terminal of claim 1, wherein the controller analyzes the section setting data, displays section information included names of sections, the play position in the moving picture, a time of section, and a thumbnail image for the moving picture of each section, using a display unit, and plays the moving picture data of selected section from the section information.

10. The mobile communication terminal of claim 1, wherein the group of cases further comprises:
   a third case where a frame rate level is set based on the variation of the number of frames per second; and
   a fourth case where a brightness level is set based on the variation in the brightness value.

11. A method for operating a mobile communication terminal having a function of photographing a moving picture, the method comprising steps of:
   setting a section to the photographed moving picture depending on a section setting command received during a course of photographing the moving picture;
   wherein the section is set to the moving picture data based on at least one of a variation of a brightness value per frame calculated from a video signal and the section setting command, the section setting command inputted to the mobile communication terminal from a pressed key;
   wherein the section is automatically set when at least one of a group of conditions are met, wherein the group of conditions include:
      an amount of variation in a number of frames per second is greater than or equal to a reference frame rate; and
      an amount of variation of the brightness value is greater than or equal to a reference brightness value;
   varying the number of frames per second at a time of photographing the moving picture based on the brightness value;
   controlling an exposure time;
   storing set section setting data together with moving picture data; and
   playing the moving picture data on a per-set section basis.

12. The method of claim 11, wherein the section is set to the moving picture data with respect to at least one of a play position and a play time of the moving picture data, and the play position or play time is stored as section setting data.

13. The method of claim 12, wherein the section setting data is stored in a STSS (synchronous sample number) of the moving picture data.

14. The method of claim 11, wherein during playing of the moving picture data the moving picture changes in its play position depending on a section selected using key pressing, and the moving picture data is played on a per-set section basis.

15. The method of claim 11, further comprising the steps of:
   outputting the section information on at least one section that is set to predetermined moving picture data; and
   reading section setting data, changing a play position into a predetermined selected section, and playing the moving picture of the selected section.

16. The method of claim 11, further comprising a step of modifying the section information on at least one section of the moving picture data and re-setting the section.

17. The method of claim 11, wherein re-setting the section includes:
   merging at least one of a plurality of sections that are set to the moving picture data or splitting one section into the plurality of sections.

18. The method of claim 11, wherein re-setting the section includes:
   changing the section information and re-setting the section setting data.

19. The method of claim 11, further comprising a step of displaying section information of the moving picture basis of the section setting data, Wherein the section information includes names of sections, the play position in the moving picture, a time of section, and a thumbnail image for the moving picture of each section.

20. The method of claim 11, wherein the group of conditions further comprise:
   a frame rate level set based on the varying number of the frames per second is varied; and
   a brightness level set based on the brightness value is varied.

* * * * *